US012632421B2

(12) United States Patent
Goren et al.

(10) Patent No.: US 12,632,421 B2
(45) Date of Patent: May 19, 2026

(54) MONITORING LARGEST FILE SYSTEM ENTITIES

(71) Applicant: VAST DATA LTD., Tel Aviv (IL)

(72) Inventors: Avi Goren, Tel Aviv (IL); Ido Sekely, Tel Aviv (IL); Ilona Osipova, Tel Aviv (IL); Shai Katz, Tel Aviv (IL); Kfir Gez, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 66 days.

(21) Appl. No.: 17/661,036

(22) Filed: Apr. 27, 2022

(65) Prior Publication Data

US 2023/0350856 A1      Nov. 2, 2023

(51) Int. Cl.
| | |
|---|---|
| *G06F 16/17* | (2019.01) |
| *G06F 12/0864* | (2016.01) |
| *G06F 13/16* | (2006.01) |
| *G06F 16/11* | (2019.01) |
| *G06F 16/13* | (2019.01) |
| *G06F 16/172* | (2019.01) |
| *G06F 16/182* | (2019.01) |

(52) U.S. Cl.
CPC ...... *G06F 16/1827* (2019.01); *G06F 12/0864* (2013.01); *G06F 13/1642* (2013.01); *G06F 16/122* (2019.01); *G06F 16/13* (2019.01); *G06F 16/172* (2019.01); *G06F 16/1734* (2019.01)

(58) Field of Classification Search
CPC .... G06F 16/1827; G06F 16/122; G06F 16/13; G06F 16/172; G06F 16/1734; G06F 16/2246; G06F 2212/60; G06F 2212/66; G06F 3/0656; G06F 12/0857; G06F 12/0864; G06F 12/0895; G06F 13/1642; G06F 13/1673
See application file for complete search history.

(56) References Cited

U.S. PATENT DOCUMENTS

| | | | | | |
|---|---|---|---|---|---|
| 10,489,301 | B1 * | 11/2019 | Visvanathan | ....... | G06F 12/0868 |
| 11,960,768 | B2 * | 4/2024 | Brewer | .............. | G06F 13/1673 |
| 2014/0173176 | A1 * | 6/2014 | Kang | .................. | G06F 12/0246 |
| | | | | | 711/103 |
| 2018/0089088 | A1 * | 3/2018 | Jakowski | ............ | G06F 12/0804 |
| 2021/0211364 | A1 * | 7/2021 | Feldmann | ............. | H04L 43/062 |
| 2021/0319022 | A1 * | 10/2021 | Makkadayil | ........ | G06F 16/2237 |
| 2022/0414102 | A1 * | 12/2022 | Shatsky | ............ | G06F 16/24552 |

* cited by examiner

*Primary Examiner* — Marcin R Filipczyk
(74) *Attorney, Agent, or Firm* — Reches Patents

(57) ABSTRACT

A method for monitoring largest file system entities of a file system that is stored in a storage system, the method may include populating, during multiple population iterations, a cache of the storage system with largest file system entities metadata; wherein a current population iteration of the multiple population iterations may include pushing, to a heap, metadata related to a set of one or more file system entities that are children of a parent file system entity that was deemed a largest file system entity of a last population iteration that preceded the current population iteration; popping the heap to provide a current largest file system entity; and storing metadata related to the current largest file system entity in the cache.

19 Claims, 7 Drawing Sheets

Heap 150

Cache 160

Root level

First level second level third level

100

300

401

23
(3)

411

5
(1)

412

10
(2)

413

5
(5)

421

422

423

4
(0)

424

3.5
(3.5)

431

432

(3)

400

Figure 5:
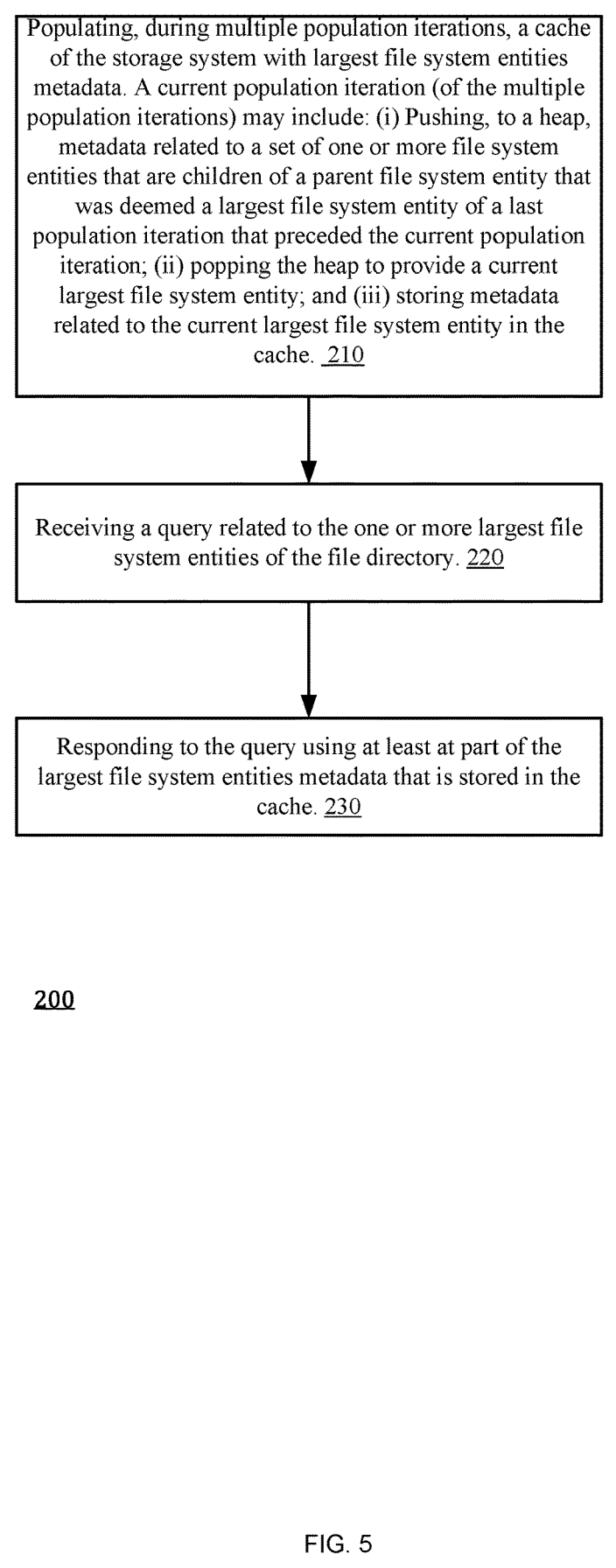

Populating, during multiple population iterations, a cache of the storage system with largest file system entities metadata. A current population iteration (of the multiple population iterations) may include: (i) Pushing, to a heap, metadata related to a set of one or more file system entities that are children of a parent file system entity that was deemed a largest file system entity of a last population iteration that preceded the current population iteration; (ii) popping the heap to provide a current largest file system entity; and (iii) storing metadata related to the current largest file system entity in the cache. 210

Receiving a query related to the one or more largest file system entities of the file directory. 220

Responding to the query using at least at part of the largest file system entities metadata that is stored in the cache. 230

Figure 6:
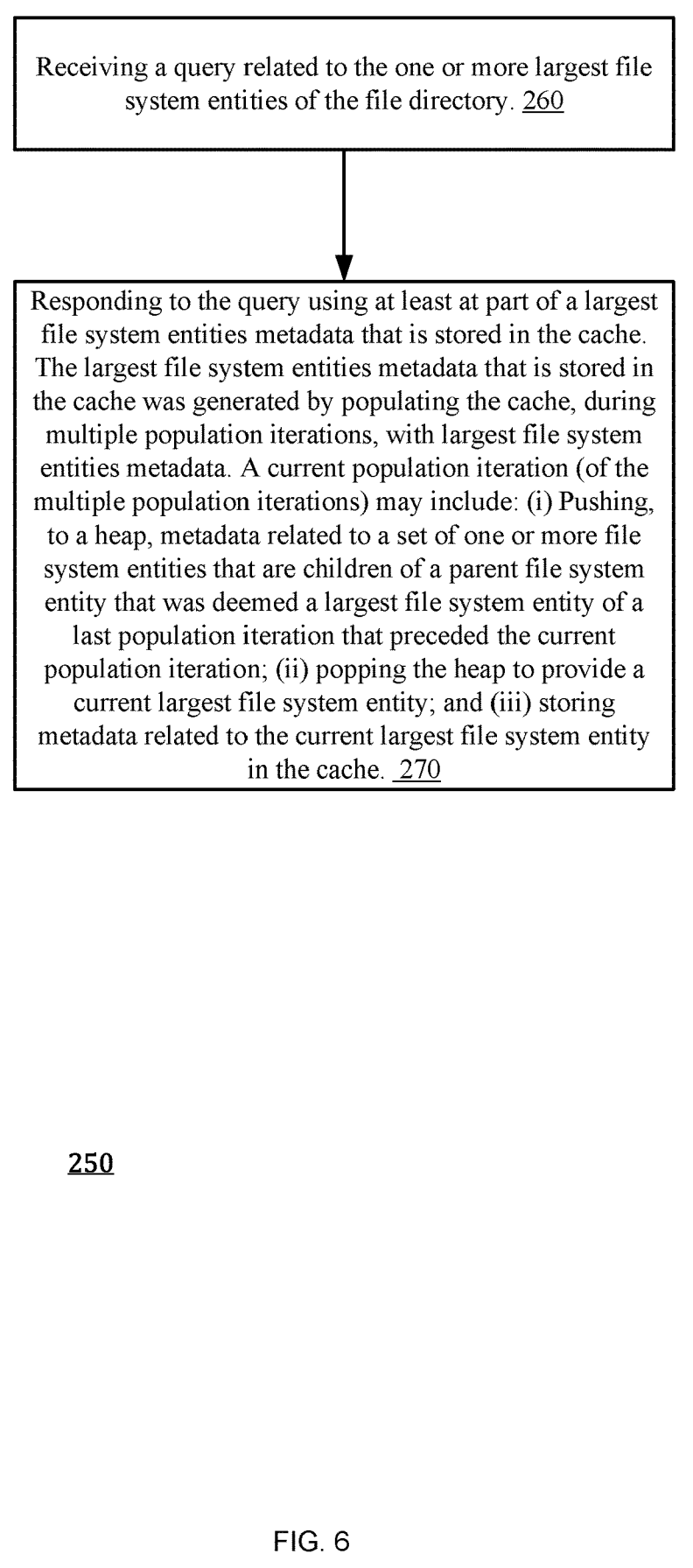

Receiving a query related to the one or more largest file system entities of the file directory. 260

Responding to the query using at least at part of a largest file system entities metadata that is stored in the cache. The largest file system entities metadata that is stored in the cache was generated by populating the cache, during multiple population iterations, with largest file system entities metadata. A current population iteration (of the multiple population iterations) may include: (i) Pushing, to a heap, metadata related to a set of one or more file system entities that are children of a parent file system entity that was deemed a largest file system entity of a last population iteration that preceded the current population iteration; (ii) popping the heap to provide a current largest file system entity; and (iii) storing metadata related to the current largest file system entity in the cache. 270

MONITORING LARGEST FILE SYSTEM ENTITIES

TECHNICAL FIELD

The present disclosure generally relates to the field of data storage, and more particularly to a monitoring largest file system entities.

BACKGROUND

File systems are getting bigger and bigger and may include more than billions of files, billions of directories, huge directories that includes multitude files, and multi-petabytes of storage.

The storage system administrator may need to monitor the largest directories that occupies substantial capacity, and may need to drill down the largest directory to further explore the underlying large directories.

Due to the vast number of files and directories and the dynamic nature of files and directories, a response to a query regarding the largest directories requires to read metadata regarding all stored files and directories-which is time and resource consuming.

There is a need for a simple and improved technique for monitoring largest file system entities.

SUMMARY

There may be provided a storage system, a method and a non-transitory computer readable medium for monitoring largest file system entities.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 5 is an example of a method;

FIG. 6 is an example of a method; and

DETAILED DESCRIPTION

Figure 1:
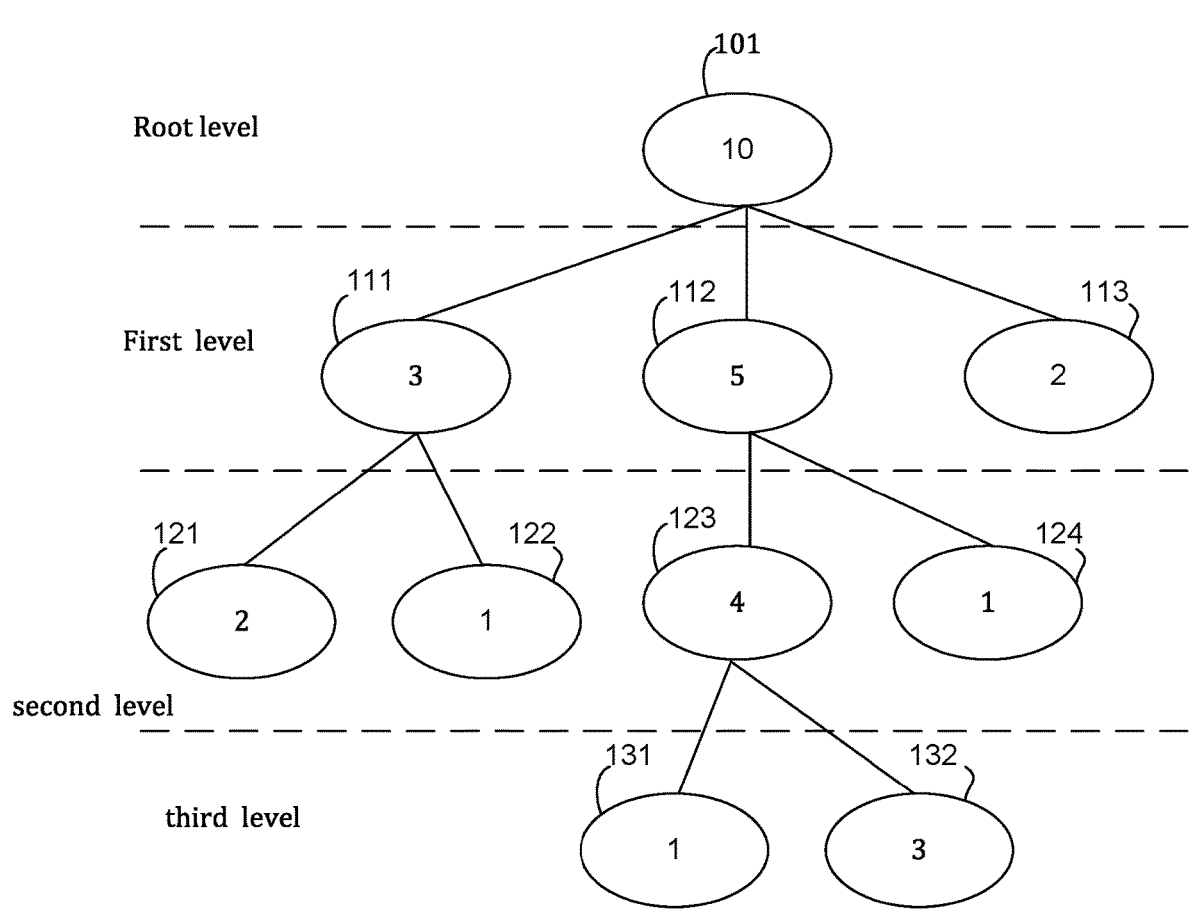
FIG. 1 is an example of a file system tree.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a controller. The controller can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a storage system, a non-transitory computer readable medium and a method monitoring largest file system entities.

The storage system described herein stores large filesystem trees that includes large directories.

By utilizing a smart caching mechanism, the system and methods enable fast retrieval of attributes of the largest directories stored in the system, as well as an efficient drilldown into the sub-directories of the largest directories, without needing to traverse the entire filesystem trees, but rather traversing only according to the largest directories, even thought, as known in the art, filesystem trees are not sorted by sizes, but rather according to hierarchies decided by a user of the storage system.

FIG. 1 illustrates a simplified example of a filesystem tree 100, along with the sizes of the directories (illustrated as tree nodes). For the sake of simplicity, each directory is illustrated as summing the sizes of the underlying sub-directories, though generally the size of each directory sums the sizes of the files stored directly under the directory, as well as the sizes of the entire sub-tree that descends from the directory. The filesystem tree 100 is part of the filesystem metadata that is stored in a permanent storage of the storage system, that may include SSDs (Solid State Drives), hard drives, NVRAM (non-volatile random-access memory), etc., and may require a remote access over a network, for example, an access via NVMe (Non-Volatile Memory Express) over fabric. The sizes or the estimated sizes of each directory may be stored as part of the directory metadata in the permanent storage.

The root directory 101 sums the size of the entire tree, and therefore is considered as the largest directory in the filesystem. The size of root 101 is illustrated as having the value '10'.

Three directories, 111, 112, and 113, descend from root 101, and illustrated with sizes that equal to 3, 5 and 2, respectively. Directory 111 has two child directories 121 and 122 with sizes 2 and 1. Directory 112 has two child directories 123 and 124 with sizes 4 and 1, where directory 123 has two child directories 131 and 132, having sizes 1 and 3, respectively.

The attributes of the largest directories are cached, so as to provide prompt responses to user queries regarding the largest directories.

Figure 2:
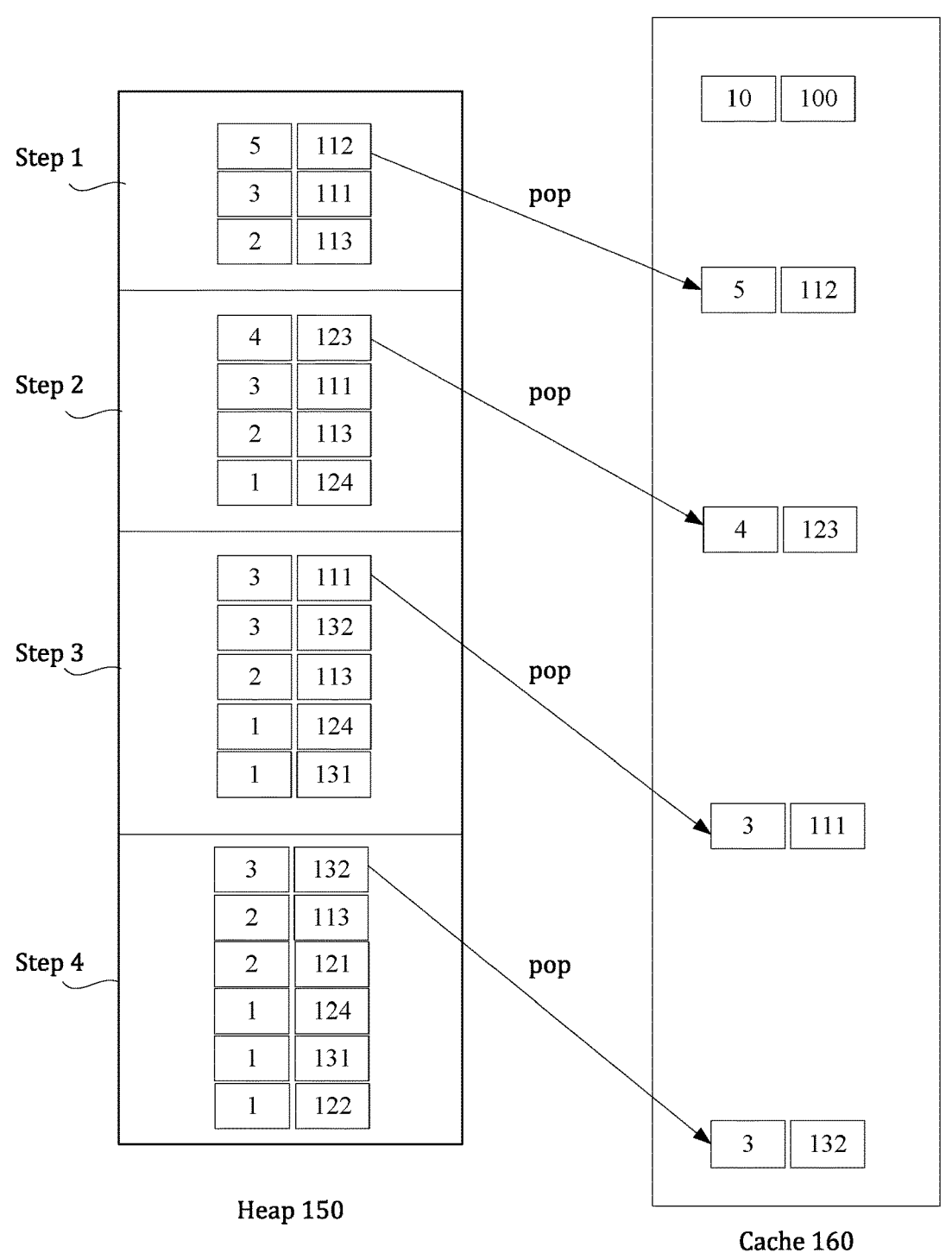
FIG. 2 is an example of a population of a cache, using a heap.

FIG. 2 illustrates an iterative cache population process for obtaining and caching the largest directories without needing to explore the entire filesystem tree 100. Cache 160 is built using a heap 150, which is a max heap where the elements pushed into the heap are directories' attributes, and the keys used for accessing the heap are the directory sizes.

A heap is a specialized data structure, where keys of elements in the heap dictate the order of elements. In a "max heap", the first element in order is the element with the highest key value. Inserting a new key to the heap is called "push". Returning the element of maximum value from a max heap is called "extract-max" or "pop". The pop operation also removes the popped element from the heap.

Each iteration handles a currently known largest directory. The child directory attributes of each child directory of the currently known largest directory—are obtained from the permanent storage, and pushed into the heap. The child directory attributes include at least the size and identity of the child directory, where the size serves as a key in the heap. The child directory attributes are obtained from the filesystem metadata that includes the filesystem tree. After pushing the attributes of the child directories, the heap is popped for extracting the largest directory that currently exists in the heap, which serves as the currently known largest directory for the next iteration.

The traversing of the filesystem tree is done by traversing only through the largest directories. A tree traversal of tree 100 starts by reading, from the filesystem metadata, information of root directory 101 that includes the information about the child directories. Given that the root directory is the largest directory, its attributes are written to cache memory 160. The cached attributes include at least the directory identifier and the size, and may further includes other attributes needed for responding to user enquiries, such as the directory name, update time, etc.

As illustrated in step 1 of FIG. 2, the attributes of three child directories 111-113 of root directory 101 are pushed into the heap along with their sizes that serve as keys. The heap is then popped for extracting the currently largest directory, which is directory 112 of the first level, having a size 5. The attributes of directory 112 are written to cache memory 160.

At step 2, the two child directories, 123 and 124, of directory 112 (the currently largest directory) are pushed into the heap, along with their sizes, 4 and 1 respectively. The heap includes also the prior pushed directories 111 and 113 of the upper (first) layer of the tree. The heap is then popped for extracting the currently largest directory, which is directory 123 of the second level, having a size 4. The attributes of directory 123 are copied to cache memory 160.

At step 3, the two child directories, 131 and 132, of directory 123 are pushed into the heap, along with their sizes, 1 and 3 respectively. Note that up to this point, the tree was traversed along its depth, i.e., traversing nodes of the second and then the third level was prioritized over nodes of the first level, due to being driven by size considerations, but this may change in the next steps, again according to size considerations.

The heap is then popped for extracting the currently largest directory, which is directory 111 having a size 3. The attributes of directory 111 are copied to cache memory 160. Note that in this case, a node of the first level is selected, being driven by size considerations.

At step 4, the two child directories, 121 and 122, of directory 111 are pushed into the heap, along with their sizes, 2 and 1 respectively. The heap is then popped for extracting the currently largest directory, which is directory 132 having a size 3. The attributes of directory 132 are entered into cache 160.

The cache now includes the largest directories (100, 112, 123, 111, 132) that exist in the filesystem tree, regardless of their level in the tree. The tree traversal included jumping from one level to another, driven only by size considerations: starting with the root level, then the first level, second level, again the first level, and the third level.

The cache population process terminates when at least one of the terms are fulfilled: (i) the cache is full; (ii) the heap is empty—may happen when the entire filesystem tree was traversed; (iii) when a size of a popped directory (the currently largest directory) is smaller than a size threshold, for example, smaller than a predefined size or predefined portion of the entire filesystem size, e.g., smaller than 3%, 1% or 0.1% of the total size, and therefore there may be no user's interest to drill down such a small directory for size enquiry. In the example of FIG. 2 the size threshold may be 3, and therefore directories having a size under 3 are not cached. Other stopping condition may also be applied.

Figure 3:
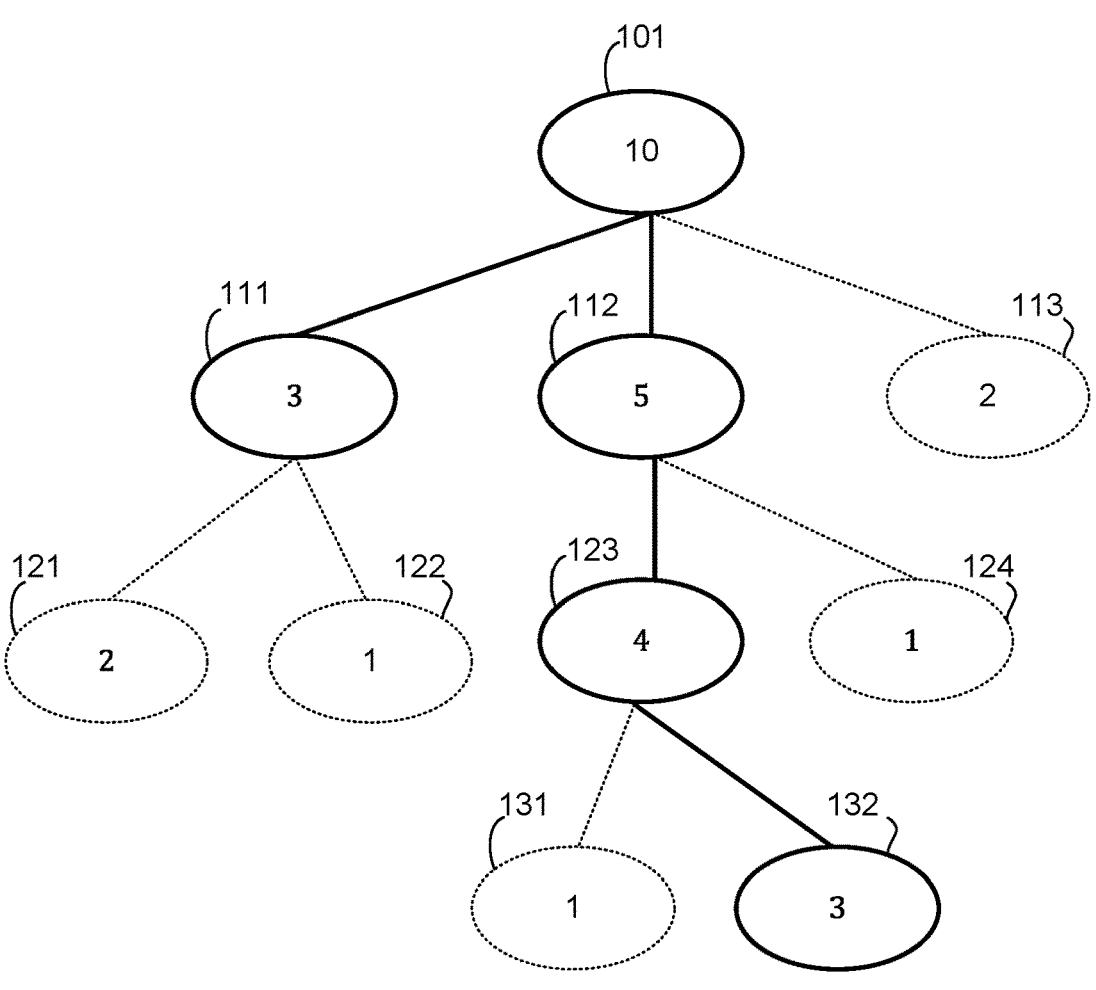
FIG. 3 is an example of a partially cached tree.

FIG. 3 illustrates the partially cached tree 300. Nodes illustrated with a solid line are cached directories, while nodes illustrated with dotted lines are non-cached directories.

The process of populating the cache with the attributes of the largest directories may be repeated periodically, for example, every 30 minutes.

The cache eviction may include evicting items that are not accessed for a certain time period (TTL-time to live), where the certain time period may be a bit longer than the time between consecutive repetitions of the cache population. For example, 35 minutes. Therefore, directories that are no longer among the largest directories are not accessed in the next iteration, and therefore may be evicted due to aging.

The storage system may respond to queries of displaying the largest directories, and may use the cache for serving such a query.

The storage system may receive a query for zooming into a specific large directory, i.e., retrieving the child directories of that directory. It is expected that in many of these cases, at least part of the child directories of a large directory (or even most or all of the child directories) are also among the cached large directories. Therefore, at least part of the query can be responded by accessing the cache, and the rest of the child directories are responded by accessing the permanent storage.

A cache miss is detected when the size of the directory to be drilled down is larger than the sum of sizes of the child directories and files under the directory, or larger by at least a certain amount, e.g., by more than 5% (since the sizes may not be accurately updated between cycles of cache population, there may be a small difference even if all the directories are cached). In this case, the missing directories are retrieved from the permanent storage.

Figure 4:
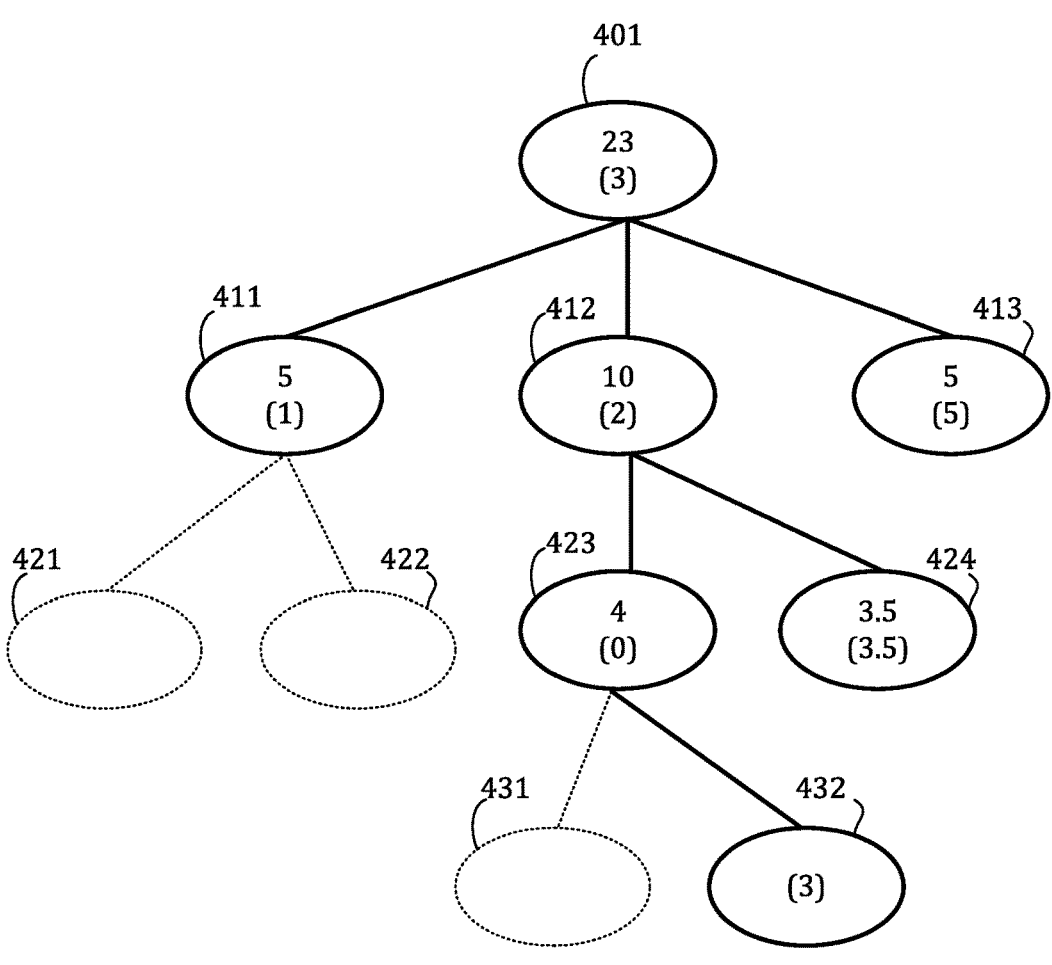
FIG. 4 is an example of a partially cached tree.

A query may be received from the user for retrieving details of several layers (e.g., 3) under a specific large directory, such as directory 401 of FIG. 4. Directory 401 is cached, as indicated by the solid lines, and its size, according to the attributes stored in the cache, is 23. The attributes may also include the size of the files that are stored directly under directory 401, where in this example, the size of the files under directory 401 sums to 3, as indicated on brackets, which is part of the total size of 23. The first layer under directory 401 includes three directories 411-413, all have cached attributes, and their sizes are 5, 10 and 5, respectively, that sum to 20. Since the size of 401 (not including directly stored files) is the same as the sum of the sizes of the cached directories beneath, it can be determined that the first layer under 401 is fully cached, and no need to retrieve further directories from the permanent storage.

In the second level under directory 401, directory 412 has a size of 10, out of which—2 is the size of the directly stored files. The sum of the sizes of the child directories plus the size of the directly stored files is 9.5 (2+4+3.5). Since the total size of the child directories and the directly stored files is 95% of the total expected size of 10, it can be determined that all the child directories (or at least the significant child directories) are cached, and no need to retrieve further directories from the permanent storage. Even if there are some additional small directories, they make no interest in terms of size.

As for the third layer under directory 423, the size of the cached child directory 432 is 3, while the size of the parent 423 is 4. Since the sum of the size of the children of parent directory 423 is only 75% of the size of 423, it can be determined that there are missing directories, and in this case, there is a need for accessing the permanent storage. The same applies to directory 411.

FIG. 5 illustrates method 200 for monitoring file system entities of a file system that is stored in a storage system.

Method 200 may be applied on multiple file systems—and the following explanations refer to a file system for simplicity of explanation. It should be noted that method 200 may be executed in parallel (and/or in a serial manner) for different file systems. One processing circuitry (or one controller) may execute method 200 for one or more than a single file system. Multiple processing circuitry may execute method 200 for different file systems.

Method 200 may include step 210 of populating, during multiple population iterations, a cache of the storage system with largest file system entities metadata.

A current population iteration (of the multiple population iterations) may include: (i) Pushing, to a heap, metadata related to a set of one or more file system entities that are children of a parent file system entity that was deemed a largest file system entity of a last population iteration that preceded the current population iteration; (ii) popping the heap to provide a current largest file system entity; and (iii) storing metadata related to the current largest file system entity in the cache. The largest file system entity is largest among any other file system entities that are stored in the heap during the popping of the heap, and also largest among file system entities that exists in the file system tree and were not yet cached by any previous population iteration. The heap is sorted according to sizes of the pushed file system entities. The metadata may include the attributes described for FIG. 2, and may be retrieved by accessing a permanent storage of the storage system that stores the full tree of the file system.

Step 210 may include ending the multiple iterations—for example when the heap is empty, and/or when the cache is full, and/or when a size of current largest file system entity is below a size threshold, and/or when a size of current largest file system entity is below a predefined fraction of an overall size of the file system.

During the first iteration of the multiple iterations the patent file system entity may be the root of the file system. And the first population iteration may include pushing to the heap metadata related to children of a root of the file system.

The metadata related to the current largest file system entity may include size information, and identification information—and/or any other metadata illustrated in the specification.

Method 200 may include repeating step 210 and/or updating the cache over time.

Method 200 may also include step 220 of receiving a query related to the one or more largest file system entities of the file system.

Step 220 may be followed by step 230 of responding to the query using at least part of the largest file system entities metadata that is stored in the cache. Step 230 may include fetching metadata that is not stored in the cache. The fetching is from a permanent storage that stores the full tree of the file system.

Step 230 may include detecting a cache miss when a difference between (i) an aggregate size of a patent file system entity and children of the parent file system entity, and (ii) a size of the patent file system entity, exceeds an aggregate size of children of the parent file system entity that have their metadata cached. The size of the patent file system entity refers to the sum of sizes of files or objects that are stored directly under the parent directory, see for example, the number in brackets of FIG. 4 that indicates the total size of files. The aggregate size of the patent file system entity and its children is the total size of the sub tree that descends from the parent plus the directly stored files, for example, the number '23' indicated in FIG. 4 for directory 401. The aggregate size and the size of the patent file system entity are cached as part of the cached metadata of the file system entities. Therefore, if the aggregate size of the cached child file system entities (as can be determined from the cached metadata) is smaller than the aggregate size indicated in the cache for the parent (not including directly stored files), then it can be determined that some of the children are missing.

FIG. 6 illustrates an example of method 250 for responding to queries.

Method 250 may start by step 260 of receiving a query related to the one or more largest file system entities of the file system.

Step 260 may be followed by step 270 of responding to the query using at least part of a largest file system entities metadata that is stored in the cache. Step 270 may include fetching metadata that is not stored in the cache.

The largest file system entities metadata that is stored in the cache may be generated by populating the cache—for example—in the manner included in step 210.

Figure 7:
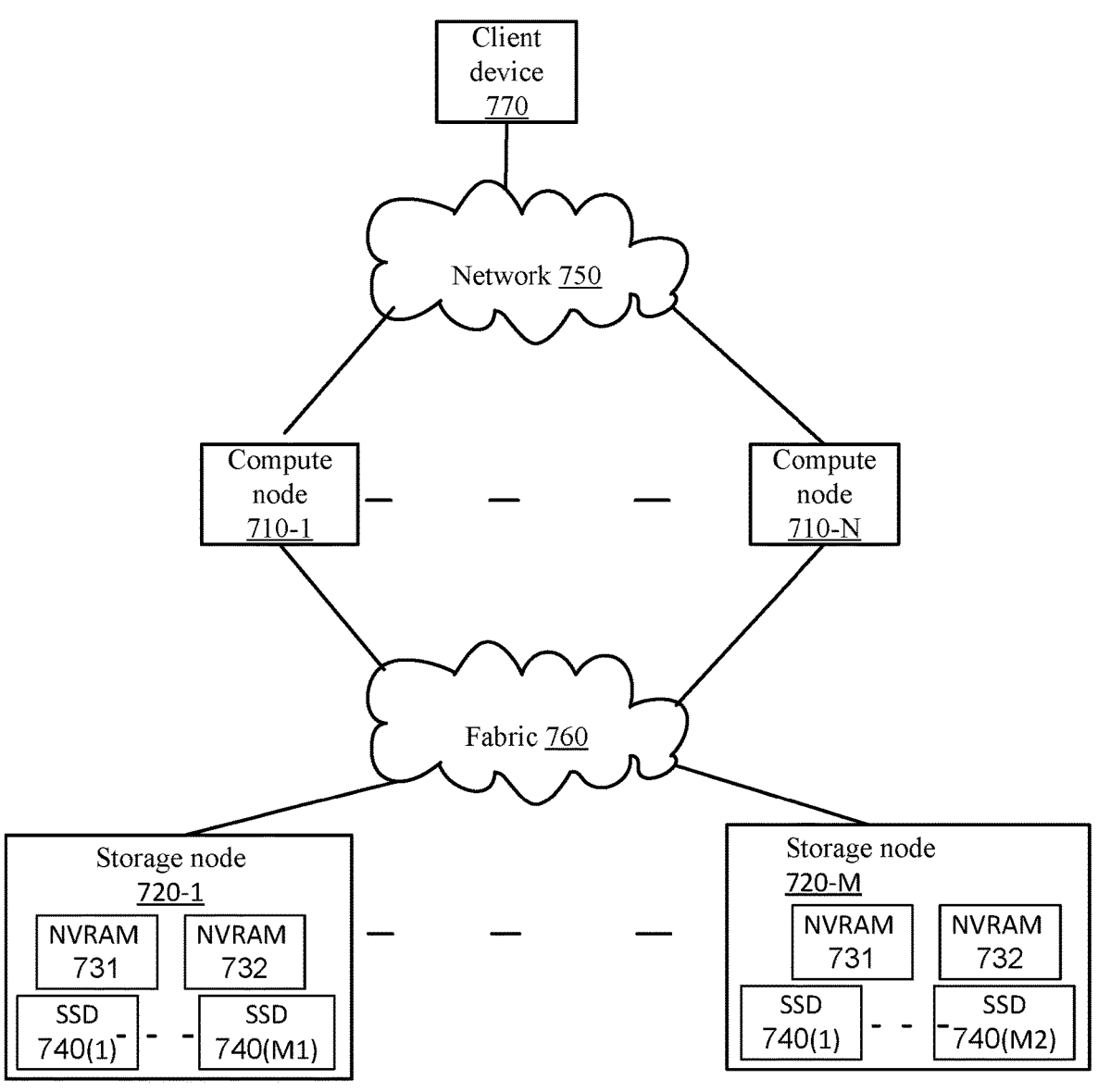
FIG. 7 is an example of a storage system.

FIG. 7 illustrates a storage system 700 that includes storage system compute elements such as multiple (N) compute nodes 710-1 to 710-N and storage resources such as multiple (M) storage nodes 720-1 to 720-M. The storage nodes may store the one or more file systems and at least one compute node may be configured to execute method 200 and/or method 250. The execution of method 200 and/or method 250 may be accelerated when it is executed in parallel by multiple storage system compute elements.

The compute nodes communicate with the storage nodes via a network, such as fabric 760, and with one or more clients, such as client device 770, via network 750, may receive a query related to the one or more largest file system entities of the file system from client device 770 and send the queries responses to client device 770. The storage nodes include various storage devices that are accessible to the compute nodes, such as RAM (Random Access Memory) and NVRAM (Non Volatile Random Access Memory) 731 and 732, SSDs (Solid State Drives) 740(1)-740(M1) of storage node 720-1, and SSDs 740(1)-740(M2) of storage node 720-2. The filesystems and the metadata related to the trees and sizes may be stored in various storage devices of the storage nodes that compose the permanent storage, and can be accessed by the compute nodes via fabric 760. The cache memory may be an internal memory within the one or more compute nodes that executes methods 200 and 250 or may be a fast accessed memory (e.g., RAM, or NVRAM) in the storage nodes that is accessible to any compute node. A storage system compute element may be a compute node or a compute entity (e.g., a processor) within the compute node.

Size metadata may be calculated in various manners. Non-limiting example of calculating size metadata of file system entities are illustrated in U.S. patent application Ser. No. 17/657,343 titled "file systems capacity estimation" which is incorporated herein by reference.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic DSs are merely illustrative and that alternative embodiments may merge logic DSs or circuit elements or impose an alternate decomposition of functionality upon various logic DSs or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for monitoring largest file system entities of a file system that is stored in a storage system, the method comprises:

populating, during multiple population iterations, a cache of the storage system with metadata related to largest file system entities among multiple file system entities of the file system, wherein the populating is done regardless of a file system level that is associated with each of the largest file system entities; and without storing in the cache, metadata related to file system entities that differ from the largest file system entities;

wherein a current population iteration of the multiple population iterations comprises:

pushing, to a heap, metadata related to a set of one or more file system entities that are children of a parent file system entity that was deemed a largest file system entity of a last population iteration that preceded the current population iteration; wherein the parent file system entity was popped from the heap during the last population iteration; wherein the parent file system entity comprises one or more directories that comprise all files of the children;

popping the heap to provide a current largest file system entity being the largest file system entity among all file system entities that currently exist in the heap, and wherein metadata of the current largest file system entity was not cached by any previous population iteration of the multiple population iterations; and storing metadata related to the current largest file system entity in the cache.

2. The method according to claim 1 wherein a first current population iteration comprises pushing to the heap metadata related to children of a root of the file system.

3. The method according to claim 1 comprising ending the populating when the heap is empty.

4. The method according to claim 1 comprising ending the populating when the cache is full.

5. The method according to claim 1 comprising ending the populating when a size of current largest file system entity is below a size threshold.

6. The method according to claim 1 comprising ending the populating when a size of current largest file system entity is below a predefined fraction of an overall size of the file system.

7. The method according to claim 1 wherein the metadata related to the current largest file system entity comprises size information, and identification information.

8. The method according to claim 1 comprising receiving a query related to the one or more largest file system entities of the file system, and responding to the query using at least at part of the metadata related to the largest file system entities that is stored in the cache.

9. The method according to claim 8 comprising detecting a cache miss when a difference between (i) an aggregate size of a parent file system entity and children of the parent file system entity, and (ii) a size of the parent file system entity, exceeds an aggregate size of children of the parent file system entity that have their metadata cached.

10. A non-transitory computer readable medium for monitoring largest file system entities of a file system that is stored in a storage system, the non-transitory computer readable medium stores instructions for:

populating, during multiple population iterations, a cache of the storage system with metadata related to largest file system entities among multiple file system entities of the file system, wherein the populating is done regardless of a file system level that is associated with each of the largest file system entities: without storing in the cache, metadata related to file system entities that differ from the largest file system entities;

wherein a current population iteration of the multiple population iterations comprises:

pushing, to a heap, metadata related to a set of one or more file system entities that are children of a parent file system entity that was deemed a largest file system entity of a last population iteration that preceded the current population iteration; wherein the parent file system entity was popped from the heap during the last population iteration; wherein the parent file system entity comprises one or more directories that comprise all files of the children;

popping the heap to provide a current largest file system entity being the largest file system entity among all file system entities that currently exist in the heap, and wherein metadata of the current largest file system entity was not cached by any previous population iteration of the multiple population iterations; and storing metadata related to the current largest file system entity in the cache.

11. The non-transitory computer readable medium according to claim 10 wherein a first current population iteration comprises pushing to the heap metadata related to children of a root of the file system.

12. The non-transitory computer readable medium according to claim 10 that stores instructions for ending the populating when the heap is empty.

13. The non-transitory computer readable medium according to claim 10 that stores instructions for ending the populating when the cache is full.

14. The non-transitory computer readable medium according to claim 10 that stores instructions for ending the populating when a size of current largest file system entity is below a size threshold.

15. The non-transitory computer readable medium according to claim 10 that stores instructions for ending the populating when a size of current largest file system entity is below a predefined fraction of an overall size of the file system.

16. The non-transitory computer readable medium according to claim 10 wherein the metadata related to the current largest file system entity comprises size information, and identification information.

17. The non-transitory computer readable medium according to claim 10 that stores instructions for receiving a query related to the one or more largest file system entities of the file system, and responding to the query using at least at part of the metadata related to the largest file system entities that is stored in the cache.

18. The non-transitory computer readable medium according to claim 17 that stores instructions for detecting a cache miss when a difference between (i) an aggregate size of a parent file system entity and children of the parent file system entity, and (ii) a size of the parent file system entity, exceeds an aggregate size of children of the parent file system entity that have their metadata cached.

19. A storage system comprising:

a cache;

at least one storage system compute element that is configured to:

populate, during multiple population iterations, the cache with metadata related to the largest file system entities among multiple file system entities of a file system stored in the storage system, wherein the at least one storage system compute element is configured to populate regardless of a file system level that is associated with each of the largest file system entities, and without storing in the cache, metadata related to file system entities that differ from the largest file system entities;

wherein a current population iteration of the multiple population iterations comprises:

pushing, to a heap, metadata related to a set of one or more file system entities that are children of a parent file system entity that was deemed a largest file system entity of a last population iteration that preceded the current population iteration; wherein the parent file system entity was popped from the heap during the last population iteration; wherein the parent file system entity comprises one or more directories that comprise all files of the children;

popping the heap to provide a current largest file system entity being the largest file system entity among all file system entities that currently exist in the heap, and wherein metadata of the current largest file system entity was not cached by any previous population iteration of the multiple population iterations; and storing metadata related to the current largest file system entity in the cache.

* * * * *